(12) United States Patent
Lee et al.

(10) Patent No.: US 12,524,043 B2
(45) Date of Patent: Jan. 13, 2026

(54) EXPANDABLE DISPLAY PANELS

(71) Applicant: Hewlett-Packard Development Company, L.P., Spring, TX (US)

(72) Inventors: Chien-Kuo Lee, Taipei (TW); Chih Yung Chi, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 18/558,938

(22) PCT Filed: May 12, 2021

(86) PCT No.: PCT/US2021/031919
§ 371 (c)(1),
(2) Date: Nov. 3, 2023

(87) PCT Pub. No.: WO2022/240400
PCT Pub. Date: Nov. 17, 2022

(65) Prior Publication Data
US 2024/0241547 A1    Jul. 18, 2024

(51) Int. Cl.
*G06F 1/16* (2006.01)
(52) U.S. Cl.
CPC .......... *G06F 1/1652* (2013.01); *G06F 1/1616* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,151,401 A * | 11/2000 | Annaratone | .......... | G06F 1/1616 381/388 |
| 6,222,507 B1 * | 4/2001 | Gouko | .................. | G06F 1/1647 361/679.04 |
| 6,532,146 B1 * | 3/2003 | Duquette | .............. | G06F 1/1607 361/679.04 |
| 7,283,353 B1 * | 10/2007 | Jordan | ..................... | H04N 5/64 345/1.3 |
| 8,018,715 B2 * | 9/2011 | Chang | .................. | G06F 1/1647 361/679.04 |
| 8,243,471 B2 * | 8/2012 | Liang | ..................... | G06F 1/1607 361/810 |
| 8,432,331 B2 * | 4/2013 | Schilling | ............. | H04M 1/0247 345/905 |
| 8,854,278 B2 * | 10/2014 | Parker | .................. | G06F 1/1647 348/794 |
| 9,696,760 B1 * | 7/2017 | Zhang | ................... | G06F 1/1652 |
| D808,950 S  * | 1/2018 | Miele | .......................... | D14/371 |
| 10,082,832 B1 * | 9/2018 | Wang | .................... | G06F 1/1681 |
| 10,082,839 B1 | 9/2018 | Turchin et al. | | |
| 10,551,880 B1 | 2/2020 | Ai et al. | | |

(Continued)

FOREIGN PATENT DOCUMENTS

CN        204291105 U       4/2015

*Primary Examiner* — Lisa Lea-Edmonds
(74) *Attorney, Agent, or Firm* — Quarles & Brady LLP

(57) ABSTRACT

An example electronic device includes a housing, and a display panel supported by the housing. The display panel comprises a pair of ends. In addition, the electronic device includes a shaft positioned within the housing that is coupled to the pair of ends of the display panel. The shaft is to fold the pair of ends of the display panel when the display panel is to transition from an expanded position to a collapsed position.

20 Claims, 7 Drawing Sheets

(56) References Cited

U.S. PATENT DOCUMENTS

| | | | |
|---|---|---|---|
| 10,602,623 B1 | 3/2020 | Myers | |
| 11,212,927 B2* | 12/2021 | Zhu | G06F 1/1681 |
| D962,221 S * | 8/2022 | Leung | D14/315 |
| D962,222 S * | 8/2022 | Leung | D14/315 |
| 11,416,024 B2* | 8/2022 | Bryant | G06F 1/1632 |
| 11,416,031 B2* | 8/2022 | Kummer | H04M 1/0235 |
| D964,360 S * | 9/2022 | Yao | D14/375 |
| D980,218 S * | 3/2023 | Yao | D14/373 |
| 11,627,675 B2* | 4/2023 | Eisenberg | H05K 5/0217 |
| | | | 361/807 |
| 11,815,953 B2* | 11/2023 | Yao | G06F 1/1649 |
| 12,038,791 B2* | 7/2024 | Yao | G06F 1/1618 |
| 2003/0043087 A1* | 3/2003 | Kim | G06F 1/1641 |
| | | | 345/1.1 |
| 2006/0082518 A1* | 4/2006 | Ram | G06F 1/1675 |
| | | | 345/1.1 |
| 2006/0268500 A1* | 11/2006 | Kuhn | G06F 1/1649 |
| | | | 361/679.04 |
| 2007/0247798 A1* | 10/2007 | Scott, II | G06F 1/1647 |
| | | | 361/679.04 |
| 2009/0102744 A1* | 4/2009 | Ram | G06F 1/1679 |
| | | | 345/1.1 |
| 2010/0060587 A1 | 3/2010 | Freund | |
| 2012/0223872 A1* | 9/2012 | Ram | G06F 1/1662 |
| | | | 345/1.3 |
| 2015/0212546 A1* | 7/2015 | Ram | G06F 1/162 |
| | | | 361/679.01 |
| 2015/0378393 A1 | 12/2015 | Erad et al. | |
| 2016/0124466 A1* | 5/2016 | Ram | G06F 1/1616 |
| | | | 361/679.26 |
| 2016/0320797 A1* | 11/2016 | Ram | G06F 1/1679 |
| 2017/0255232 A1* | 9/2017 | Ram | G06F 1/1681 |
| 2018/0004252 A1 | 1/2018 | Ahrens et al. | |
| 2018/0088630 A1* | 3/2018 | Ram | G06F 1/1666 |
| 2018/0150112 A1 | 5/2018 | Aoki et al. | |
| 2018/0275717 A1* | 9/2018 | Ram | G06F 3/1446 |
| 2021/0080999 A1* | 3/2021 | Bryant | G06F 1/1641 |
| 2021/0227708 A1* | 7/2021 | Zhu | G09F 9/301 |
| 2022/0019263 A1* | 1/2022 | Sun | G06F 1/1616 |
| 2023/0022114 A1* | 1/2023 | Eisenberg | G06F 1/1618 |
| 2023/0284405 A1* | 9/2023 | Eisenberg | G06F 1/1649 |
| | | | 361/807 |
| 2024/0241547 A1* | 7/2024 | Lee | G06F 1/1652 |

* cited by examiner

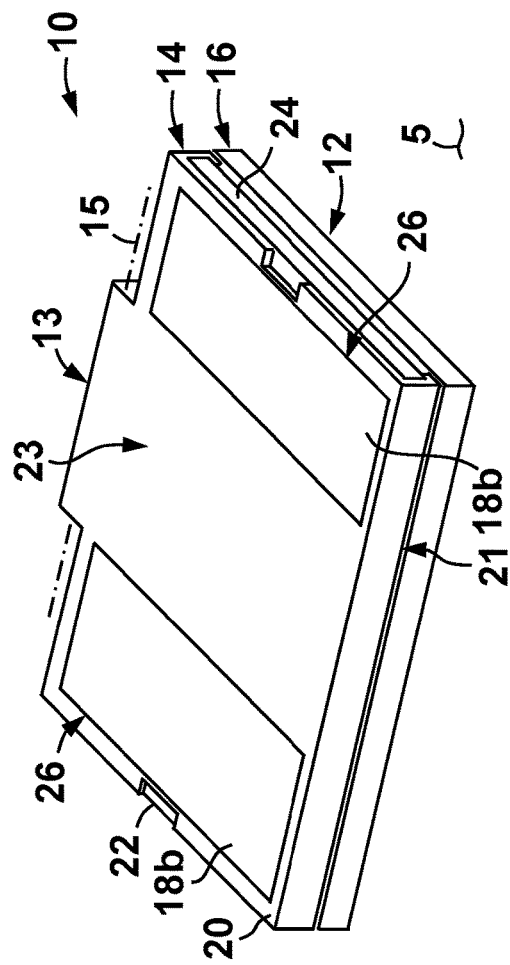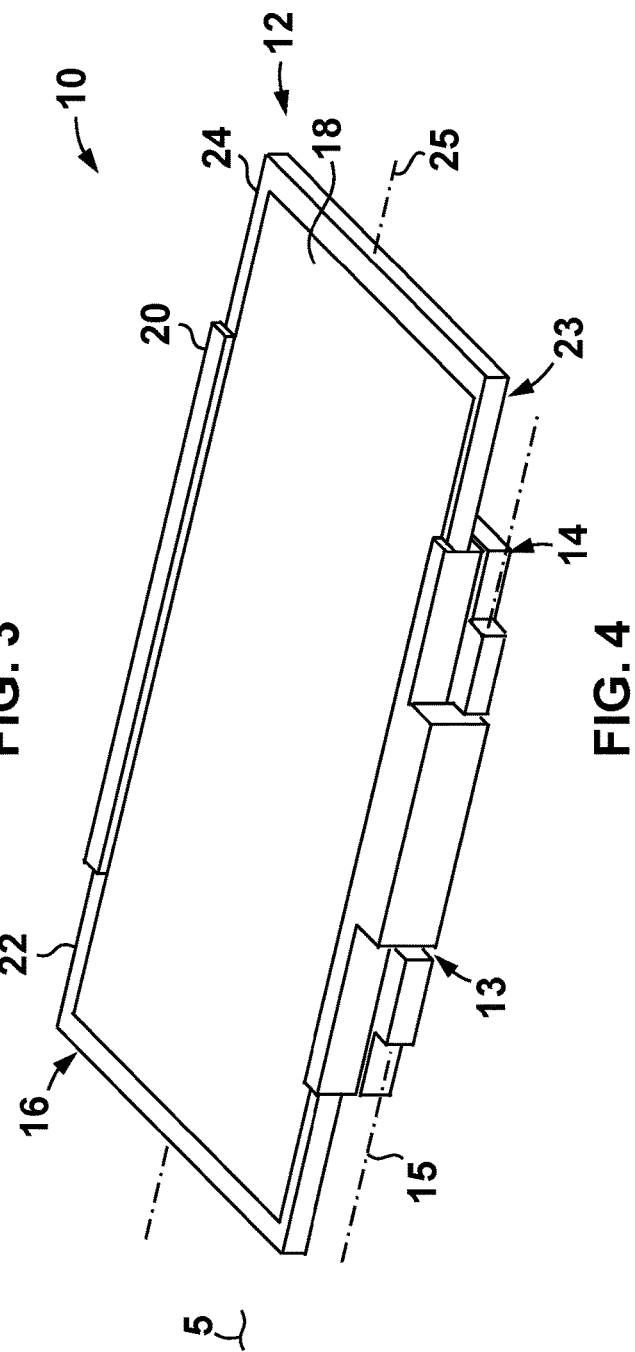
FIG. 3
FIG. 4

EXPANDABLE DISPLAY PANELS

BACKGROUND

An electronic device may include a display panel to display images (e.g., text, pictures, video, graphics) during use. In addition, an electronic device may be a mobile device that is transported from place to place.

BRIEF DESCRIPTION OF THE DRAWINGS

Various examples will be described below referring to the following figures:

FIG. 3 is a perspective view of the electronic device of FIG. 1 with the housing of the electronic device in a closed position according to some examples;

FIG. 4 is a perspective view of the electronic device of FIG. 1 with the housing of the electronic device in a tablet position according to some examples;

DETAILED DESCRIPTION

An electronic device may be a mobile device that is transported from place to place, and may include a display panel for displaying images. A user may desire a relatively large display panel to enhance viewability. However, the dimensions of the electronic device may be reduced to ensure the transportability thereof, and this reduction in size may limit a size of the display panel.

Accordingly, the examples disclosed herein include an electronic device having an expandable (or retractable) display panel. Thus, through use of the example electronic devices disclosed herein, a user may selectively increase a size (or surface area) of the display panel to enhance viewability, and may selectively decrease the size (or surface area) of the display panel to facilitate the transportation of the electronic device.

Figure 1:
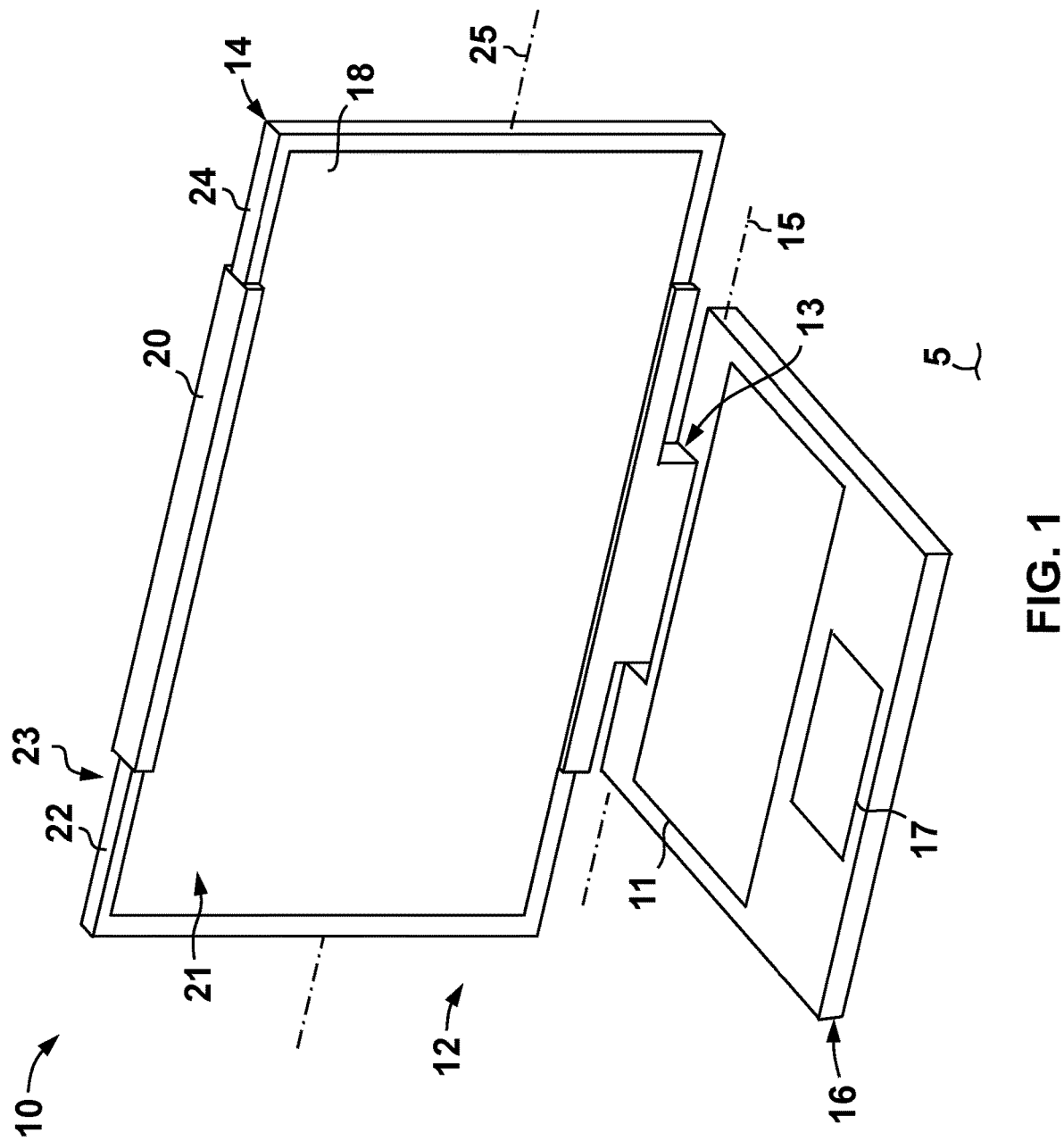
FIG. 1 is a perspective view of an electronic device having an expandable display panel, with the display panel in an expanded position according to some examples.
Figure 2:
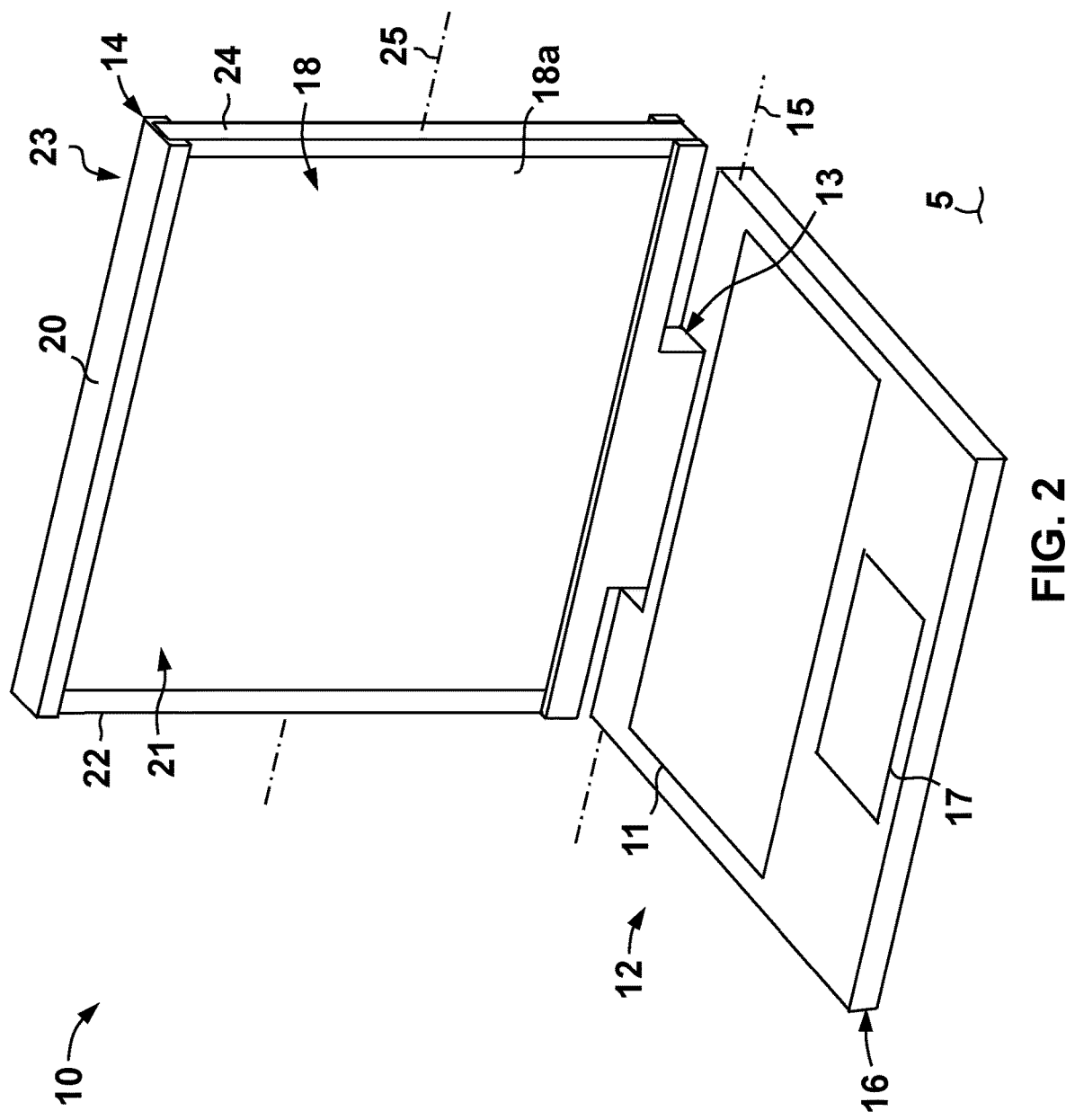
FIG. 2 is a perspective view of the electronic device of FIG. 1 with the display panel in a collapsed position according to some examples.

Referring now to FIGS. 1 and 2, an electronic device 10 having an expandable (or retractable) display panel 18 according to some examples is shown. As used herein, the term "electronic device," refers to a device that is to carry out machine-readable instructions, and may include internal components, such as, processors, power sources, memory devices, etc. For example, an electronic device may include, among other things, a tablet computer, a laptop computer, a desktop computer, an all-in-one computer, a smartphone, etc. In some examples, the electronic device 10 comprises a laptop computer including a clamshell style housing 12. In particular, housing 12 includes a first housing member 14, and a second housing member 16 coupled to one another via a hinge 13. Thus, during operations, the first housing member 14 may pivot about an axis of rotation 15, via hinge 13, relative to second housing member 16. The first housing member 14 and the second housing member 16 may each be referred to herein as a "housing." Accordingly, the first housing member 14 may be referred to as a housing 14, and the second housing member 16 may be referred to as a housing 16.

The second housing member 16 supports a plurality of use input devices. For instance, in some examples, the second housing member 16 supports a keyboard 11 (e.g., physical keyboard, digital keyboard) and a touch sensitive surface (e.g., a trackpad). During operations, the second housing member 16 may engage with a support surface 5 (e.g., a table, desk, counter-top, floor), such that housing 12 is generally supported on the support surface 5 by second housing member 16.

First housing member 14 supports a display panel 18. The display panel 18 may display images during operations. Display panel 18 may utilize any suitable technique or technology for displaying images. For instance, display panel 18 may comprise a light emitting diode (LED) display, such as a micro-LED display or an organic LED (OLED) display. In some examples, display panel 18 may comprise a liquid crystal display (LCD), such as an organic LCD, or an electrophoretic display. In addition, display panel 18 may comprise a flexible display panel. As used herein, the term "flexible display panel" refers to a display panel that may be deformed (e.g., rolled, folded, etc.) within a given parameter or specification (e.g., a minimum radius of curvature) without losing electrical function or connectivity.

First housing member 14 includes a central body 20 and a pair of wings 22, 24 (including a first wing 22 and a second wing 24). As used herein, the term "wings" refers to members or structures that may be actuatable relative to a central portion of a housing (e.g., central body 20). The wings 22, 24 may be linearly extendable from opposing sides of central body 20. More particularly, the wings 22, 24 may be translated linearly toward and away from the central body 20 along an axis 25 to transition the display panel 18 between an expanded position and a collapsed position. The axis 25 may extend through the first housing member 14 in a direction that is parallel to the axis of rotation 15 of hinge 13.

In particular, as best shown in FIG. 1, the display panel 18 may be transitioned to an expanded position by expanding (or translating) the wings 22, 24 linearly outward from central body 20 along axis 25. In addition, as best shown in FIG. 2, the display panel 18 may be transitioned to a collapsed position by retracting the wings 22, 24 linearly inward toward central body 20 along axis 25. Without being limited to this or any other theory, the expanded position of FIG. 1 may generally increase a visible surface area of the display panel 18 to facilitate viewing images thereon, and the collapsed position of FIG. 2 may reduce the outer dimensions of the first housing member 14 to facilitate the transportation and storage of the electronic device 10. As is described in more detail below, when transitioning the display panel 18 from the expanded position (FIG. 1) to the collapsed position (FIG. 2), the display panel 18 may be folded and/or rolled within the first housing member 14 to accommodate the movement of the wings 22, 24 relative to central body 20.

Referring still to FIGS. 1 and 2, first housing member 14 includes a first or front side 21 and a second or rear side 23 opposite front side 21. During operations, the housing 12 may be in an open position in which the first housing member 14 is rotated away from the second housing member 16 so that an angle therebetween about the axis of rotation 15 is less than 180°. In the open position of FIGS. 1 and 2, the display panel 18 may be transitioned between the expanded position and collapsed position as previously described and may be generally viewable along front side 21.

Referring now to FIG. 3, in some examples, the housing 12 may be transitioned to a closed position in which the first housing member 14 is rotated about hinge 13 to engage the front side 21 of first housing member 14 with second housing member 16. In this closed position, the front side 21 may be generally occluded by the second housing member 16.

Regardless of whether the housing 12 is in the open position of FIGS. 1 and 2 or the closed position of FIG. 3, the display panel 18 may be transitioned to the collapsed position (FIG. 2) such that a first portion 18a of the display panel 18 is visible along the front side 21 of first housing member 14, and a pair of second or folded portions 18b of display panel 18 are visible along rear side 23 of first housing member 14. In particular, when the display panel 18 is transitioned to the collapsed position (FIG. 2) the folded portions 18b are folded within the first housing member 14 (e.g., via the tensioner 50 and geared mechanism 60 as described in more detail below) such that the folded portions 18b may be viewable via transparent (or semi-transparent) windows or regions 26 formed on central body 20 along the rear side 23. In some examples, the windows 26 may comprise apertures or openings in central body 20 along rear side 23. When the display panel 18 is in the collapsed position (FIG. 2), and the housing 12 is in the open position, both the first portion 18a and the folded portions 18b of the display panel 18 may be visible depending on the relative position of the viewer. However, when the display panel 18 is in the collapsed position of FIG. 2, and the housing 12 is in the closed position of FIG. 3, the first portion 18a of the display panel 18 may be occluded from view by the second housing member 16, but the folded portions 18b may be visible along rear side 23.

In some examples, the electronic device 10 may display the same or different content on the first portion 18a and the folded portions 18b of display panel 18. In some examples, the electronic device 10 may deactivate the first portion 18a or the folded portions 18b depending on whether the housing 12 is in the open position or closed position. For instance, when the display panel 18 is in the collapsed position, and the housing 12 is in the closed position (e.g., such as depicted in FIG. 3), the electronic device 10 (or a controller or processor thereof) may deactivate the first portion 18a, but may activate the folded portions 18b of display panel 18.

Referring now to FIG. 4, in some examples, housing 12 of electronic device 10 may be transitioned to a so-called tablet mode in which the first housing member 14 is rotated about hinge 13 to engage the rear side 23 with the second housing member 16. In the tablet position of FIG. 4, the display panel 18 may be transitioned to either the expanded position (FIG. 1) or to the collapsed position (FIG. 2). In the depiction of FIG. 4, the display panel 18 is placed in the expanded position. In some examples, the electronic device 10 may comprise a tablet computer such that the housing 12 comprises the first housing member 14 and lacks the hinge 13 and second housing member 16.

Figure 5:
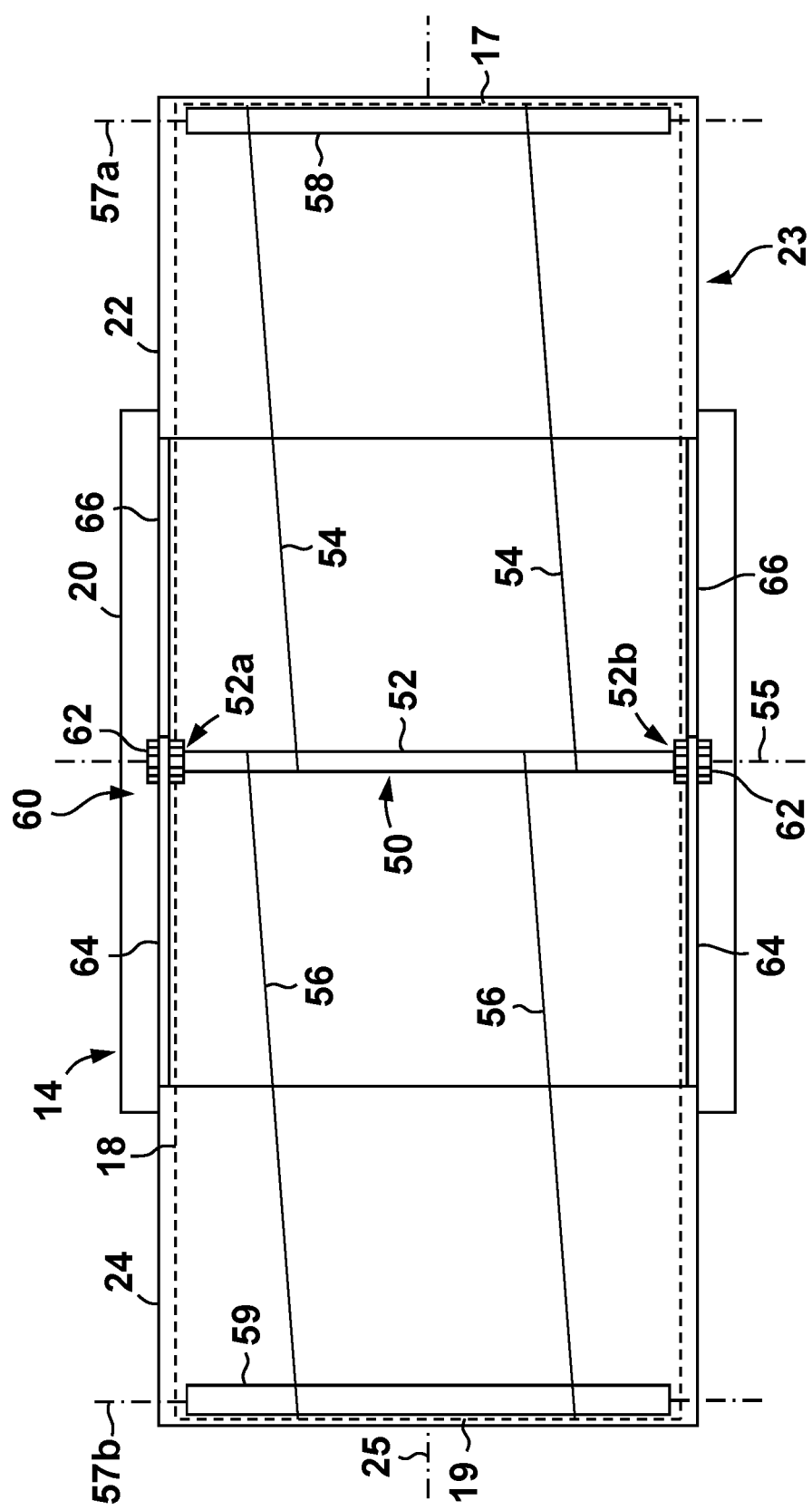
FIG. 5 is a rear, internal view of a first housing member of the electronic device of FIG. 1 showing a geared mechanism and tensioner when the display panel is in the extended position according to some examples.

Referring now to FIG. 5, a tensioner 50 and geared mechanism 60 may be positioned within the first housing member 14 that is to facilitate the movement of the display panel 18 and wings 22, 24 when transitioning the display panel 18 between the expanded position (FIG. 1) and the collapsed position (FIG. 2). In the depiction of FIG. 5, the outline of the central body 20 and wings 22, 24 is shown to indicate their positions, but otherwise, the outer walls of the central body 20 and wings 22, 24 are removed so as to illustrate tensioner 50 and geared mechanism 60. In addition, in the depiction of FIG. 5, the display panel 18 is shown in dotted line, again so as to enhance the viewability of the tensioner 50 and geared mechanism 60. Further, the view of FIG. 5 is a rear view of first housing member 14 that faces the rear side 23 (FIG. 1).

Tensioner 50 includes a shaft 52 having a longitudinal axis 55, a first end 52a, and a second end 52b opposite first end 52a. Shaft 52 is positioned within central body 20 of first housing member 14 such that longitudinal axis 55 extends in a direction that is generally perpendicular to a direction of axis 25 (however, note that the axes 25, 55 may or may not intersect in some examples).

A plurality of wires 54, 56 is coupled to the shaft 52. In addition, the wires 54, 56 are coupled to opposing ends 17, 19, respectively, of display panel 18. The end 17 may be referred to as a "first end" of display panel 18, and the end 19 may be referred to as a "second end" of display panel 18. In particular, a set (or plurality) of first wires 54 is coupled to and extends between shaft 52 and first end 17, and a set (or plurality) of second wires 56 is coupled to and extends between shaft 52 and second end 19. In some examples, the shaft 52 may be coupled to first end 17 with one wire 54, and may be coupled to second end 19 with one wire 56.

A pair of bearings 58, 59 are positioned within wings 22, 24, respectively, of first housing member 14. The bearings 58, 59 may be generally cylindrical in shape and may be rotatable about corresponding longitudinal axes 57a, 57b within the wings 22, 24, respectively. In particular, the bearings 58, 59 may be positioned within wings 22, 24 such that the longitudinal axes 57a, 57b are oriented parallel to the longitudinal axis 55 of shaft 52.

Referring still to FIG. 5, the geared mechanism 60 may comprise a pair of gears 62 coupled to the ends 52a, 52b of shaft 52. In addition, geared mechanism 60 may comprise a plurality of gear racks (or more simply racks) 64, 66 coupled to wings 22, 24 that are meshed (or mated) with the gears 62 to synchronize movement of the wings 22, 24 and drive rotation of the shaft 52 about longitudinal axis 55 during operations. In some examples, the first housing member 14 may include a pair of gears 62 and corresponding meshed racks 64, 66 as shown in FIG. 5. However, in some examples, the first housing member 14 may include a single gear 62 and corresponding meshed racks 64, 66 positioned at one of the ends 52a, 52b of shaft 52.

Figure 6:
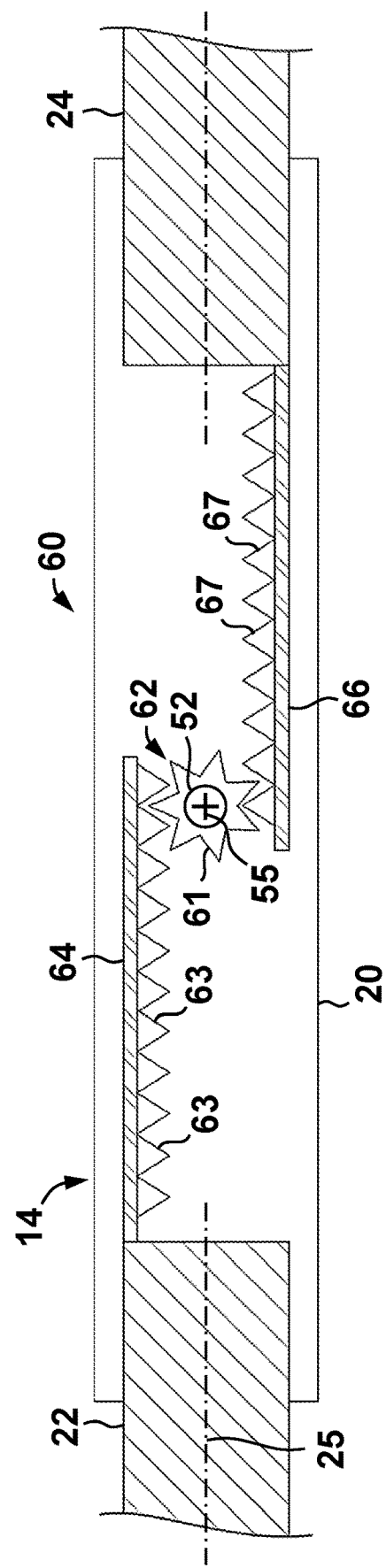
FIG. 6 is a schematic partial cross-sectional view of the geared mechanism of FIG. 5 according to some examples.

Referring now to FIG. 6, one of gears 62 and corresponding, meshed racks 64, 66 of FIG. 5 are shown in greater detail. The rack 64 is coupled to wing 22 and includes a first plurality of gear teeth 63 arranged adjacent one another in an axial direction with respect to axis 25. The rack 66 is coupled to wing 24 and includes a plurality of gear teeth 67 arranged adjacent to one another in an axial direction with respect to axis 25. The gear 62 is mounted to shaft 52 (e.g., at one of the ends 52a, 52b as previously described and shown in FIG. 5). Thus, during operations, the gear 62 may rotate about the longitudinal axis 55 of shaft 52. Gear 62 also includes a plurality of gear teeth 61 disposed about a circumference thereof. The gear teeth 61 are meshed with the plurality of gear teeth 63 of rack 64 and the plurality of gear teeth 67 of rack 66.

During operations, a movement of one of the wings 22, 24 axially (or linearly) toward or away from central body 20 may cause a corresponding, synchronized movement of the other wing 22, 24 due to the engagement between the teeth 61 of gear 62 and teeth 63, 67 of racks 64, 66, respectively. For instance, if the wing 22 is moved axially inward along axis 25 toward central body 20, the gear 62 may be rotated about longitudinal axis 55 (e.g., in a clockwise motion in the view of FIG. 6) via the engagement of the teeth 63, 61, and the rotation of gear 62 also drives movement of the wing 24 axially inward along axis 25 toward central body 20 via the engagement of teeth 67, 61. Conversely, if the wing 22 is moved axially outward along axis 25 away from central body 20, the gear 62 may be rotated about longitudinal axis 55 (e.g., in a counterclockwise motion in the view of FIG. 6) via the engagement of the teeth 63, 61, and the rotation of gear 62 also drives movement of the wing 24 axially outward along axis 25 away from central body 20 via the engagement of teeth 67, 61. In this manner, a synchronized movement of the wing 22 may result from a corresponding axially inward or outward movements of the wing 24 via geared mechanism 60. Thus, during operations, the geared mechanism 60 may synchronize extension of the wings 22, 24 away from central body 20 and retraction of the wings 22, 24 toward the central body 20 when transitioning the display panel 18 (FIG. 5) between the extended position (FIG. 1) and the collapsed position (FIG. 2). In addition, during operations the geared mechanism 60 may drive rotation of the shaft 52 about longitudinal axis 55 during movement of the wings 22, 24 along axis 25.

Figure 7:
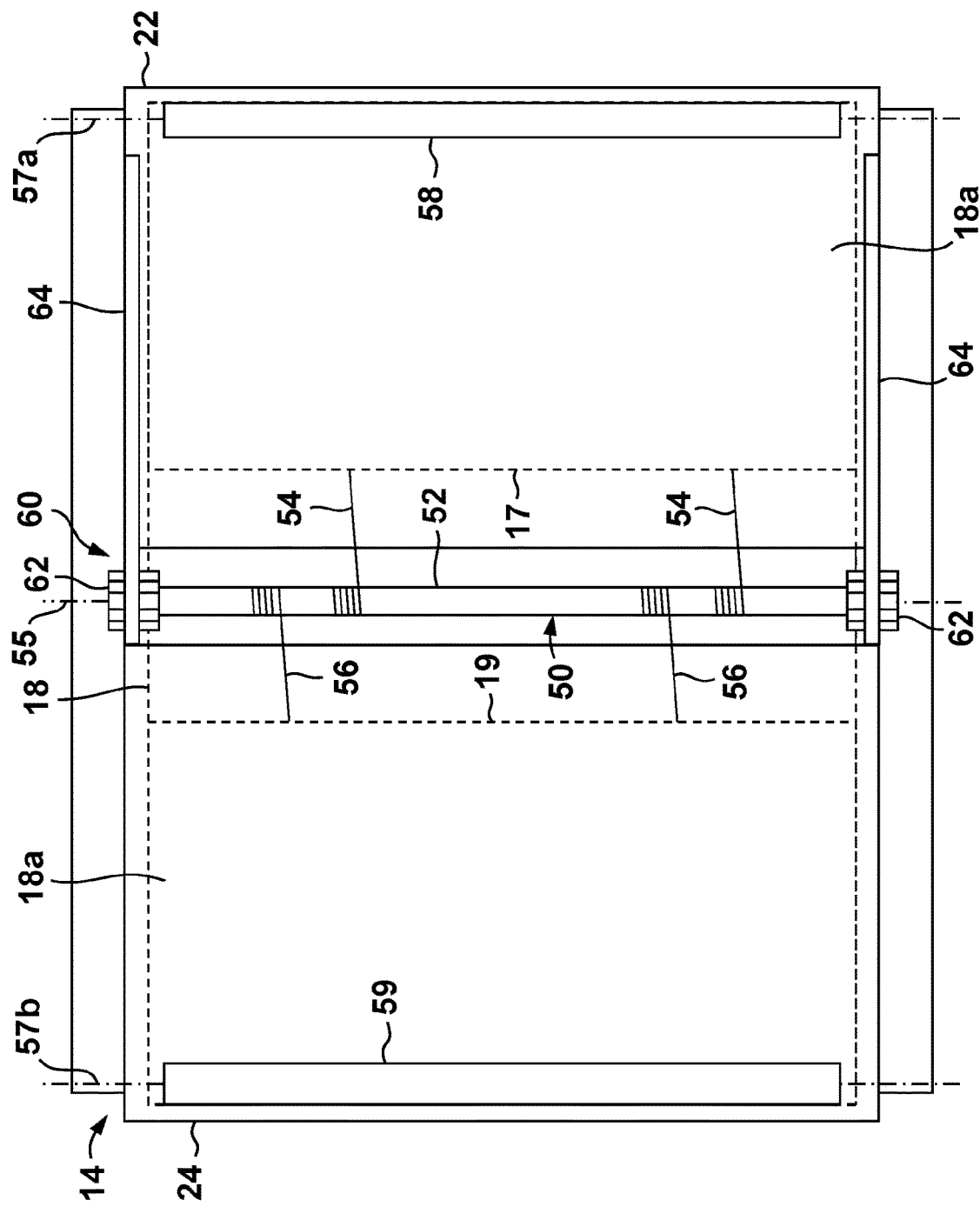
FIG. 7 is a rear, internal view of the first housing member of the electronic device showing the geared mechanism and tensioner of FIG. 5 when the display panel is in the collapsed position according to some examples.

Referring now to FIGS. 5 and 7, when the display panel 18 is in the extended position, such as shown in FIG. 5, the set of first wires 54 may be extended over the bearing 58 within wing 22, and the set of second wires 56 may be extended over the bearing 59 within wing 24. As shown in FIG. 7, when the display panel 18 is transitioned to the collapsed position (FIG. 2), the shaft 52 may rotate about longitudinal axis 55 via the geared mechanism 60 as previously described, such that the wires 54, 56 are wound on to the shaft 52 and the ends 17, 19 of display panel 18 are pulled over the bearings 58, 59 to form folded portions 18b of the display panel 18 for viewing through the windows 26 (FIG. 3) as previously described.

Figure 8:
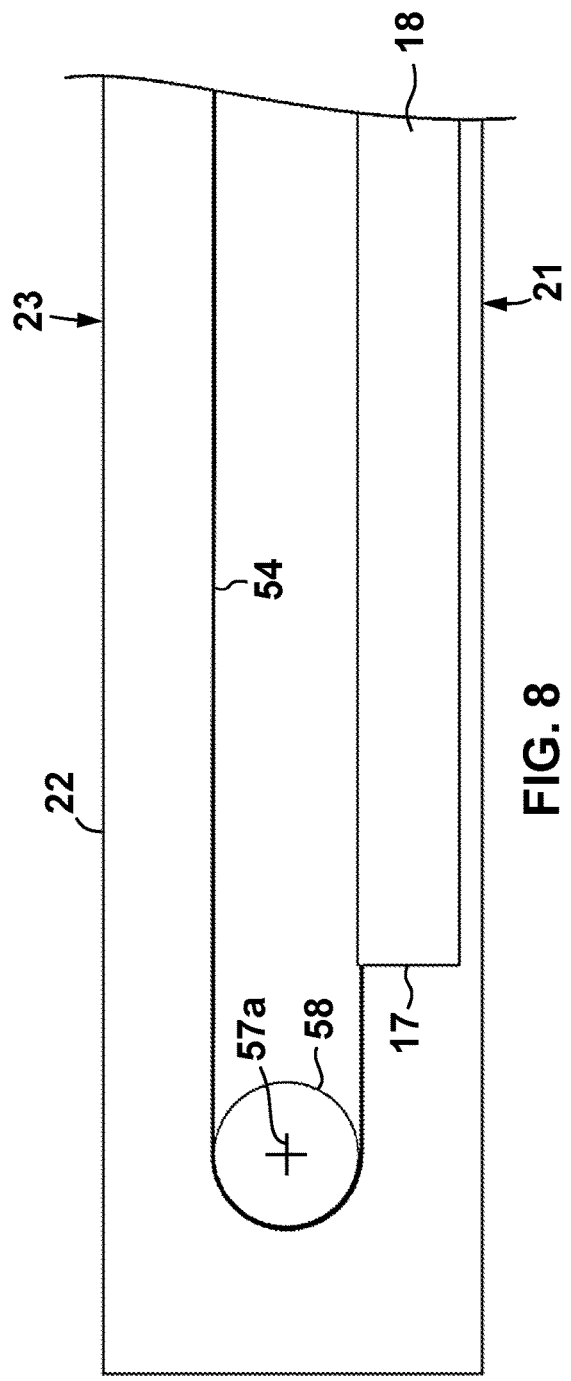
FIGS. 8 and 9 are enlarged side views of a wing of the first housing member showing the movement of an end of the display panel when the display panel is transitioned between the extended and collapsed positions according to some examples.
Figure 9:
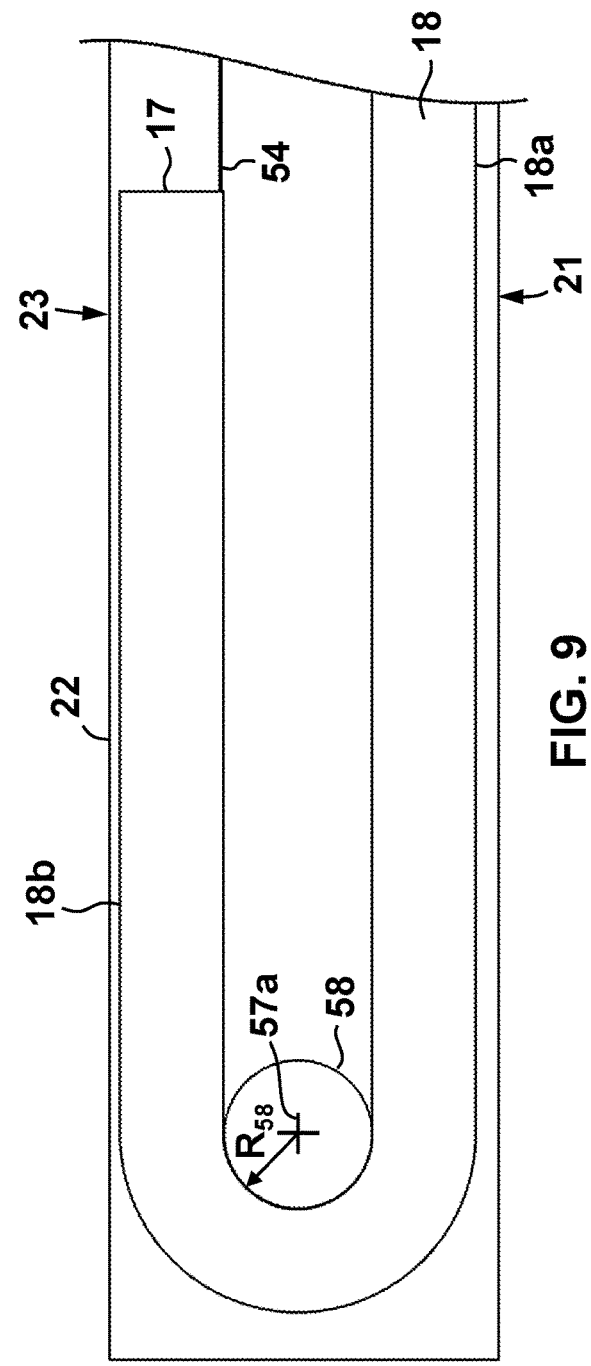

Referring now to FIGS. 8 and 9, the movement of the first end 17 of display panel 18 within wing 22 is shown as wing 22 is retracted axially (or linearly) toward central body 20 (FIGS. 1 and 2) to transition the display panel 18 to the collapsed position, is shown. To simplify the drawings, the central body 20 and wing 24 are omitted from FIGS. 8 and 9. In addition, the movement of second end 19 within wing 24 may also be in the manner described below for first end 17. As shown in the sequence from FIG. 8 to FIG. 9, as the wing 22 is moved axially inward along axis 25 toward central body 20, the first end 17 is pulled, via wire(s) 54 around bearing 58 to form the folded portion 18b that is visible along the rear side 23 of first housing member 14 and the first portion 18a that is visible along the front side 21 of first housing member 14. As shown in FIG. 9, the bearing 58 may have an outer radius $R_{58}$ that is equal to or greater than a minimum radius of curvature for the display panel 18 for preventing damage thereto. In addition, while not shown, the bearing 59 may also have an outer radius that is equal to or greater than a minimum radius of curvature for the display panel 18 for preventing damage thereto.

The examples disclosed herein include an electronic device having an expandable (or retractable) display panel. Thus, through use of the example electronic devices disclosed herein, a user may selectively increase a size (or surface area) of the display panel to enhance viewing thereof, and may selectively decrease the size (or surface area) of the display panel to facilitate the transportation of the electronic device.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
   a housing;
   a display panel supported by the housing, wherein the display panel comprises a pair of ends,
   a shaft positioned within the housing that is coupled to the pair of ends of the display panel;
   wherein the shaft is to fold the pair of ends of the display panel when the display panel is to transition from an expanded position to a collapsed position.

2. The electronic device of claim 1, wherein the housing comprises a central body and a pair of wings, wherein the wings are to expand outward from the central body when the display panel is transitioned to the expanded position, and the wings are to expand inward toward the central body when the display panel is transitioned to the collapsed position.

3. The electronic device of claim 2, wherein the wings are to expand linearly from the central body when the display panel is transitioned to the expanded position, and the wings are to retract linearly inward toward the central body when the display panel is transitioned to the collapsed position.

4. The electronic device of claim 2, wherein the housing comprises a plurality of gears to synchronize movement of the wings relative to the central body when the display panel is transitioned to the expanded position or the collapsed position.

5. The electronic device of claim 1, wherein the pair of ends of the display panel are coupled to the shaft via a plurality of wires, wherein the wires are wound onto the shaft when the display panel is transitioned to the collapsed position.

6. The electronic device of claim 1, wherein the display panel is a flexible display panel.

7. The electronic device of claim 1, wherein the display panel comprises an increased visible surface area along a front of the housing when in the expanded positioned compared to the collapsed position.

8. An electronic device, comprising:
- a housing comprising:
  - a central body; and
  - a pair of wings that are linearly extendable from opposite sides of the central body;
- a geared mechanism coupled to the pair of wings that is to synchronize an extension of the pair of wings away from the central body; and
- a display panel coupled to the housing, wherein the display panel comprises a pair of ends that are coupled to the wings.

9. The electronic device of claim 8, wherein the geared mechanism comprises:
- a first rack coupled to a first wing of the pair of wings;
- a second rack coupled to a second wing of the pair of wings; and
- a gear meshed with both the first rack and the second rack.

10. The electronic device of claim 9, comprising a plurality of wires that are coupled to the pair of ends of the display panel and the gear.

11. The electronic device of claim 10, wherein the plurality of wires are wound on a shaft that is coupled to the gear, wherein the gear is to rotate about a longitudinal axis of the shaft.

12. The electronic device of claim 11, wherein the gear and shaft are positioned in the central body.

13. The electronic device of claim 8, wherein the geared mechanism is positioned within the housing.

14. The electronic device of claim 8, wherein a visible surface area of the display panel along a front of the housing is increased when the pair of wings are extended away from the central body, and reduced when the pair of wings are retracted toward the central body.

15. The electronic device of claim 8, wherein the display panel comprises a visible surface area along a rear of the housing when the pair of wings are retracted toward the central body.

16. An electronic device, comprising:
- a housing;
- a display panel supported by the housing, wherein the housing is to linearly expand or retract along an axis; and
- a tensioner positioned within the housing that is coupled to a pair of opposing ends of the display panel such that the tensioner is to pull the pair of opposing ends toward the tensioner.

17. The electronic device of claim 16, wherein the housing comprises a pair of bearings, wherein the tensioner is to pull the pair of opposing ends of the display panel over the bearings when the display panel is retracted along the axis.

18. The electronic device of claim 17, wherein when the display panel is linearly retracted along the axis, a first portion of the display panel is visible along a first side of the housing and a second portion of the display panel is visible along a second side of the housing that is opposite the first side.

19. The electronic device of claim 16, wherein the tensioner comprises a shaft that is coupled to the pair of opposing ends via a plurality of wires.

20. The electronic device of claim 19, wherein the housing comprises a geared mechanism that is to rotate the shaft when the display panel is expanded or retracted along the axis.

* * * * *